United States Patent
Jin et al.

(10) Patent No.: US 10,444,861 B2
(45) Date of Patent: Oct. 15, 2019

(54) DISPLAY APPARATUS AND CONTROL METHOD THEREOF

(71) Applicant: Samsung Electronics Co., Ltd., Suwon-si (KR)

(72) Inventors: Kyoung-shin Jin, Yongin-si (KR); Hye-jeong Lee, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 288 days.

(21) Appl. No.: 15/395,853

(22) Filed: Dec. 30, 2016

(65) Prior Publication Data

US 2017/0192641 A1 Jul. 6, 2017

(30) Foreign Application Priority Data

Jan. 6, 2016 (KR) .................. 10-2016-0001661

(51) Int. Cl.
*G06F 3/048* (2013.01)
*G06F 3/03* (2006.01)
*G06F 3/033* (2013.01)
*G06F 3/0484* (2013.01)
*G06F 3/01* (2006.01)
*G06F 3/16* (2006.01)
*G06F 3/00* (2006.01)

(52) U.S. Cl.
CPC ............. *G06F 3/033* (2013.01); *G06F 3/005* (2013.01); *G06F 3/017* (2013.01); *G06F 3/0304* (2013.01); *G06F 3/0484* (2013.01); *G06F 3/167* (2013.01); *G06F 2203/0381* (2013.01)

(58) Field of Classification Search
CPC .......... G06F 3/048; G06F 3/033; G06F 3/005; G06F 3/017; G06F 3/0304; G06F 3/0484; G06F 3/167
See application file for complete search history.

(56) References Cited

U.S. PATENT DOCUMENTS

| | | | | |
|---|---|---|---|---|
| 5,774,118 A | * | 6/1998 | Hatakama | G06F 9/453 715/707 |
| 6,963,937 B1 | * | 11/2005 | Kamper | G06F 3/038 345/156 |
| 7,742,580 B2 | * | 6/2010 | Cooper | G10L 15/22 379/68 |
| 8,381,238 B2 | * | 2/2013 | Sano | G06F 3/011 463/36 |

(Continued)

FOREIGN PATENT DOCUMENTS

| | | |
|---|---|---|
| JP | 2013-219613 | 10/2013 |
| KR | 10-2005-0037702 | 4/2005 |

(Continued)

*Primary Examiner* — Mahelet Shiberou
(74) *Attorney, Agent, or Firm* — Staas & Halsey LLP

(57) ABSTRACT

Provided is a display apparatus, which includes a display, an inputter or input device configured to input user commands to execute a function of the display apparatus, a storage configured to store a user experience index matched with each of the user commands where the user experience index represents utilization of the display apparatus by a user, and a processor configured to determine the user experience index corresponding to the input user command based on a previously-stored user experience index, and control the display to display the determined user experience index.

15 Claims, 14 Drawing Sheets

(56) References Cited

U.S. PATENT DOCUMENTS

| | | | |
|---|---|---|---|
| 8,577,859 | B2 | 11/2013 | Archambault et al. |
| 8,601,023 | B2 | 12/2013 | Brave et al. |
| 8,745,206 | B1 | 6/2014 | Chang et al. |
| 8,793,212 | B2 | 7/2014 | McGuire |
| 8,972,177 | B2 | 3/2015 | Zheng et al. |
| 9,002,924 | B2 | 4/2015 | Saretto et al. |
| 9,064,018 | B2 | 6/2015 | Akiyama |
| 9,092,739 | B2 | 7/2015 | Steck |
| 9,098,813 | B1 | 8/2015 | Konig et al. |
| 9,117,006 | B2 | 8/2015 | Zhu et al. |
| 9,129,216 | B1 | 9/2015 | Andras |
| 2008/0148150 | A1* | 6/2008 | Mall ................ G06F 3/038 715/707 |
| 2009/0265630 | A1* | 10/2009 | Morikawa ............ H04N 5/44 715/708 |
| 2010/0013760 | A1* | 1/2010 | Hirai ................ G06F 3/167 345/156 |
| 2011/0010646 | A1* | 1/2011 | Usey ................ A61F 4/00 715/762 |
| 2013/0033644 | A1* | 2/2013 | Kim ............ H04N 21/42203 348/563 |
| 2015/0286328 | A1* | 10/2015 | Lee ................ G06F 3/0412 345/173 |

FOREIGN PATENT DOCUMENTS

| | | |
|---|---|---|
| KR | 10-2012-0114436 | 10/2012 |
| KR | 10-1226895 | 1/2013 |

\* cited by examiner

FIG. 3A
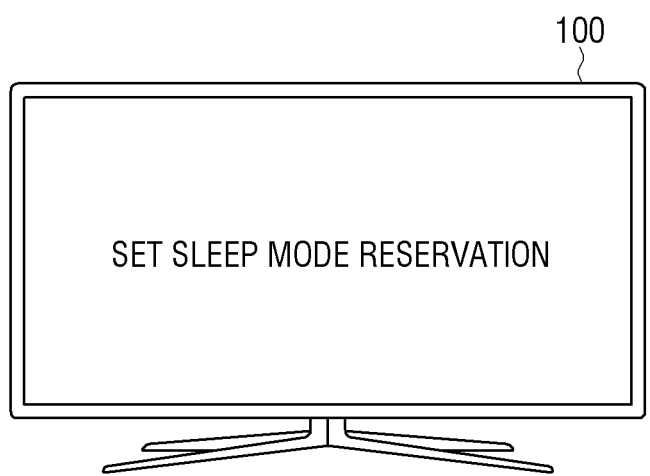
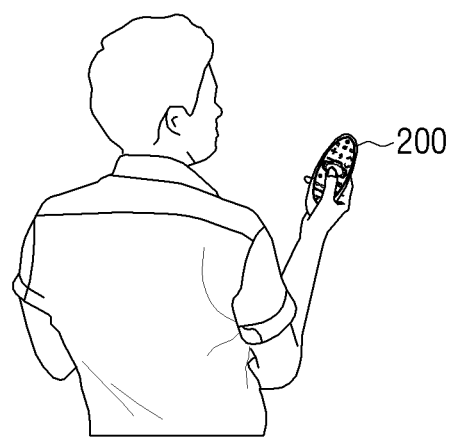

FIG. 3B

FIG. 3C
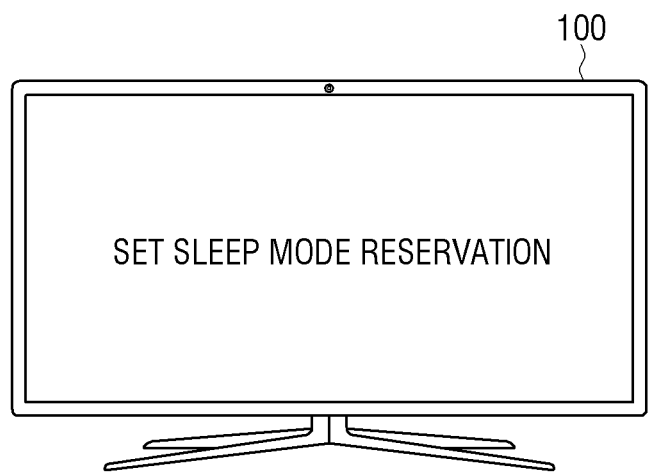
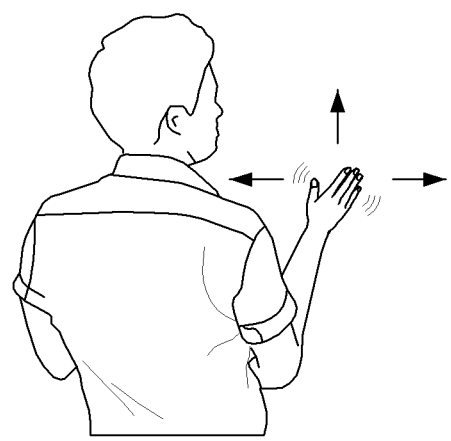

FIG. 4

| TYPE | USER EXPERIENCE INDEX OF INPUT TYPE FOR SLEEP MODE RESERVATION |
|---|---|
| REMOTE CONTROL | 10 |
| VOICE | 20 |
| MOTION | 30 |
| ⋮ | ⋮ |

FIG. 5

| TYPE | USER EXPERIENCE INDEX OF INPUT TYPE FOR SLEEP MODE RESERVATION | |
|---|---|---|
| | INPUT METHOD | USER EXPERIENCE INDEX |
| REMOTE CONTROL | A+B+C KEY INPUT | 5 |
| | PRESS-LONG D | 10 |
| | PRESS TOUCH PAD AND CONTROL POINTER | 5 |
| VOICE | SPEAK "SLEEP MODE RESERVATION," AND INPUT E+F KEY | 25 |
| | "SLEEP MODE RESERVATION FOR 7 O'CLOCK." | 30 |
| MOTION | WAVE HAND BEFORE SENSOR AND MOTION-CONTROL POINTER | 20 |
| | PRESS G KEY ON REMOTE CONTROLLER AND CONTROL POINTER | 15 |
| ⋮ | | |

DISPLAY APPARATUS AND CONTROL METHOD THEREOF

CROSS-REFERENCE TO RELATED APPLICATIONS

This application claims priority from Korean Patent Application No. 10-2016-0001661, filed on Jan. 6, 2016 in the Korean Intellectual Property Office, the disclosure of which is incorporated herein by reference in its entirety.

BACKGROUND

1. Field

Apparatuses and methods consistent with what is disclosed herein relate to a display apparatus and a control method thereof, and more particularly, to a display apparatus having a variety of functions and a control method thereof.

2. Description of the Related Art

Development of electronic technology has enabled development of various types of display apparatuses. Among these, the display apparatuses such as TVs, PCs, laptop computers, tablet PCs, mobile phones, MP3 players, and so on have been distributed widely and used at most homes.

In order to meet customer's needs for newer and more diverse functions, efforts have recently been made to develop display apparatuses to newer forms.

Meanwhile, methods of using display apparatuses have been diversified from a usual way of using control device such as a remote controller, to a variety of control methods such as voice recognition controlling, controlling by way of user's motion, and so on. For example, in order to reserve sleep mode that automatically turns off display apparatus at predetermined time, methods such as using remote controller in a manner of using a mouse, instructing with voices, instructing with motions performed by user's body parts, or other methods are used.

While there are a variety of methods for executing functions of display apparatus as described above, it is certainly not easy to be familiarized with these functions.

Accordingly, a method is necessary, with which various functions of the display apparatus can be used with enhanced utilization.

SUMMARY

Additional aspects and/or advantages will be set forth in part in the description which follows and, in part, will be apparent from the description, or may be learned by practice of the embodiments.

Exemplary embodiments of the present inventive concept overcome the above disadvantages and other disadvantages not described above. Also, the present inventive concept is not required to overcome the disadvantages described above, and an exemplary embodiment of the present inventive concept may not overcome any of the problems described above.

According to an embodiment, a technical objective is to provide a display apparatus capable of increasing user's utilization of a variety of methods provided to execute the functions of the display apparatus, and a control method thereof.

In order to achieve the objects mentioned above, in an exemplary embodiment, a display apparatus is provided, which may include a display, an input configured to be inputted with user commands to execute a function of the display apparatus, a storage configured to store a user experience index matched with each of the user commands, wherein the user experience index represents utilization of the display apparatus by a user, and a processor configured to determine the user experience index corresponding to the inputted user command based on previously-stored user experience index, and control the display to display the determined user experience index.

Meanwhile, in an exemplary embodiment, a control method of a display apparatus is provided, which may include inputting user commands to execute a function of the display apparatus, determining the user experience index corresponding to the inputted user command, based on previously-stored user experience index matched with each of the user commands, and displaying the determined user experience index.

Further, in an exemplary embodiment, a non-transitory computer readable storage medium stores a control method as described above.

According to exemplary embodiments, user experience indices representing user's utilization of the display apparatus are provided to the user, thus enhancing utilization of the display apparatus.

BRIEF DESCRIPTION OF THE DRAWINGS

The above and/or other aspects of the present inventive concept will be more apparent by describing certain exemplary embodiments of the present inventive concept with reference to the accompanying drawings, in which:

FIGS. 3A to 3C are views provided to explain different types of inputting methods according to an exemplary embodiment of the present disclosure;

FIG. 4 is a view provided to explain a method for determining a user experience index according to an exemplary embodiment of the present disclosure;

FIG. 5 is a view provided to explain a method for determining a user experience index according to another exemplary embodiment of the present disclosure;

DETAILED DESCRIPTION

Figure 1:
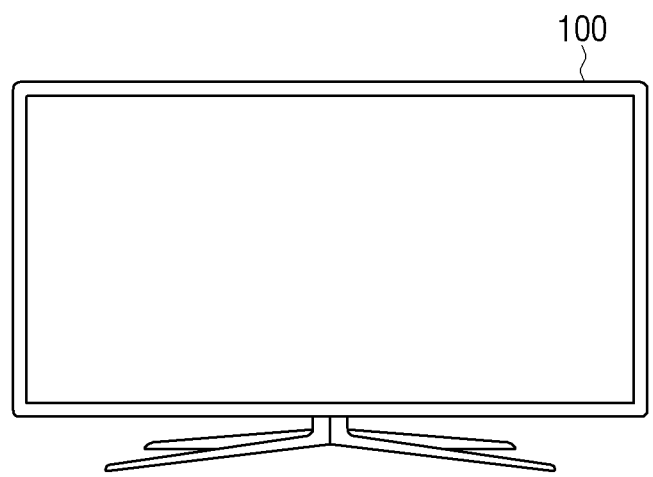
FIG. 1 is a view provided to explain a display apparatus and a control device, according to an example of an embodiment of the present disclosure.

Reference will now be made in detail to the embodiments, examples of which are illustrated in the accompanying drawings, wherein like reference numerals refer to the like elements throughout. The embodiments are described below by referring to the figures.

In describing the embodiments, well-known functions or constructions are not described in detail since they would obscure the invention with unnecessary detail.

First, although the terms used in the disclosure are selected from generally known and used terms while considering functions of the disclosure, they may vary according to intention or customs of those skilled in the art, to legal or technical interpretation, or to emergence of new technology. Some of the terms mentioned in the description of the disclosure may have been selected by the applicant at his or her discretion, and in such cases the detailed meanings thereof will be described in relevant parts of the description herein. Thus, the terms used in this disclosure should be interpreted based on the substantial meanings of the terms and the whole content of this disclosure rather than their simple names or meanings.

Further, the same reference numerals or symbols used in the drawings attached hereto represent the parts or components serving substantially the same functions. For convenience of explanation and understanding, these are described with the same reference numerals or symbols even in different exemplary embodiments. Therefore, when a plurality of drawings illustrate all the components having the same reference numerals, the plurality of drawings do not necessarily represent one exemplary embodiment.

A singular expression includes a plural form unless specified otherwise. Throughout the specification, the expression "comprise" or "have" is used to designate an existence of a certain feature, numeral, step, operation, component, part, or a combination thereof, and not to exclude a possibility of additional existence of one or more features, numerals, steps, operations, components, parts or combinations thereof.

Terms such as "module," "unit," "part," and so on are used herein to designate the components for performing at least one function or operation, and these may be implemented as hardware or software, or as a combination of hardware and software. Further, unless each are necessarily implemented as specific individual hardware, a plurality of "modules," "units," "parts," and so on may be integrated into at least one module or chip and implemented with at least one processor (not illustrated).

Further, in the exemplary embodiments of the present disclosure, when a certain portion is stated as being connected to another portion, this means not only a direct connection, but also an indirect connection made via another medium. Further, when a certain portion comprises a certain component, unless otherwise specified, this does not foreclose another component, but rather, mean that another component may be additionally included.

Meanwhile, a processor is configured to control the apparatus, and may also be referred to as "central processing unit (CPU)," "microprocessor," "controller," and so on, and implemented as a system-on-a-chip (SOC), or system-on-chip (SoC) to control the overall operation of the apparatus.

In describing the exemplary embodiments of the present disclosure, related or known functions or configurations will be described as brief as possible or will not be described at all, when detailed description thereof can obscure the subject matter of the present disclosure.

FIG. 1 is a view provided to explain a display apparatus according to an exemplary embodiment of the present disclosure.

Referring to FIG. 1, the display apparatus 100 performs a variety of functions in response to user commands.

For example, when implemented as TV, the display apparatus 100 may perform a variety of functions as those that are provided on a general TV such as, displaying broadcast programs provided through channels, recording broadcast programs, and so on, in response to the user command.

The "user command" as used herein refers to command to execute a function provided by the display apparatus 100, which may be inputted by a user to the display apparatus 100 intended for execution of the function of the display apparatus 100, by using a remote controller or with motions or voices.

In the example described above, the display apparatus 100 may determine a user experience index for the inputted user command, and provide the same to the user.

The "user experience index" as used herein refers to numeral representation of the user's utilization of the display apparatus 100, which may be set to a relatively higher value for the user command that can execute the function of the display apparatus 100 with more efficiency in view of convenience, and so on.

Specifically, the user may execute the functions provided by the display apparatus 100 with a variety of methods.

For example, even when using the same input means, the user may execute specific functions provided by the display apparatus 100 with different methods.

For a more specific example, it is assumed that sleep mode is reserved for the display apparatus 100 using a remote controller.

In this example, the user may select a menu button provided on the remote controller and set a sleep mode reservation function through the menu screen as provided. In another example, the user may select a shortcut key allocated on the remote controller for the sleep mode reservation or, when a pattern for the sleep mode reservation function is predefined, the user may set the sleep mode reservation function by selecting the buttons provided on the remote controller in the predefined pattern (e.g., by simultaneously or sequentially selecting buttons A, B, and C provided on the remote controller).

Further, the user may execute a specific function provided by the display apparatus 100, using different input means from each other.

In a specific example, in order to execute the sleep mode reservation function for the display apparatus 100, the user may use a remote controller, or may use motions or voices.

As described above, when a variety of methods are available for executing the functions of the display apparatus 100, the respective methods may be viewed as being different by accessibility.

That is, in the examples described above, the example of using shortcut key buttons may be considered to be relatively more efficient accessing method than the example of using menu buttons, because using shortcut key buttons enables set sleep mode reservation function with a simpler manipulation.

Accordingly, in order to provide information on whether the user is currently executing the function of the display apparatus 100 efficiently, and, also to guide for or to a more efficient way of executing the function of the display apparatus, the display apparatus 100 may express, by numbers, how efficient the user commands are when the user commands to execute the function of the display apparatus 100 are inputted, to determine the user experience index for the inputted user commands and provide the same to the user. Further, the display apparatus 100 may provide the user with information on more efficient accessing method, based on the user experience index.

Figure 2:
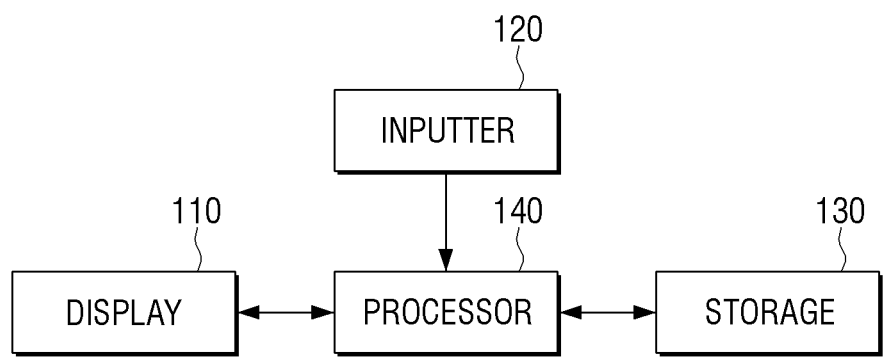
FIG. 2 is a block diagram provided to explain a configuration of a display apparatus according to an exemplary embodiment of the present disclosure.

FIG. 2 is a block diagram provided to explain a configuration of a display apparatus according to an exemplary embodiment of the present disclosure.

Referring to FIG. 2, the display apparatus 100 includes a display 110, an input device or inputter 120, a storage 130, and a processor 140.

The display 110 displays a variety of screens. Specifically, the display 110 may display a variety of screens to provide the user with information on the user experience index corresponding to the user commands, and information on the user commands other than the inputted user commands.

The inputter 120 receives the user command as an input. That is, the inputter 120 may receive, as an input, the user command to execute a function of the display apparatus 100.

In the above example, the user commands may be inputted with various types of input methods, in which case the inputter 120 may include a variety of components to receive the user commands. For example, the inputter 120 may receive the user command inputted by the user through the remote controller, at a remote controller signal receiver (not illustrated). Further, the inputter 120 may photograph the user's motions through a camera (not illustrated) to receive the user's motion commands, or receive voices uttered by the user through a microphone (not illustrated) to receive the user's voice command.

The storage 130 may store various programs and data necessary for the operation of the display apparatus 100.

In particular, the storage 130 may store various data to provide the user with user experience index.

Specifically, the storage 130 may store the user experience index matched with each of the user commands.

That is, the storage 130 may store information on user experience index corresponding to each of user commands to execute the function of the display apparatus 100.

For example, it is assumed herein that a method for setting a sleep mode reservation function using the menu buttons provided on the remote controller (not illustrated) is available.

In the above example, the storage 130 may store the user experience index corresponding to the user command through the menu buttons to set the sleep mode reservation function.

In addition, when there is a plurality of user commands to execute the function of the display apparatus 100, the storage 130 may store the information on the user experience index for each of the plurality of user commands.

For example, it is assumed herein that the methods for setting sleep mode reservation function include a method of using menu buttons provided on the remote controller (not illustrated), and also a method of using shortcut key buttons provided on the remote controller (not illustrated), and a method of selecting buttons provided on the remote controller (not illustrated) in a predefined pattern.

In the above example, the store 130 may store user experience index for each of the user command for setting the sleep mode reservation function by menu buttons, user command for setting sleep mode reservation function through shortcut key buttons, and user command for setting sleep mode reservation function through buttons in a predefined pattern.

Further, the storage 130 may store information on user experience index corresponding to each of the user commands to execute the function for the display apparatus 100, according to types of input methods.

For example, it is assumed that the methods for setting sleep mode reservation function include a method of using a remote controller (not illustrated), a method of using voices, and a method of using motions.

In the above example, the storage 130 may store user experience index for each of the user command for setting sleep mode reservation function with remote controller, user command for setting sleep mode reservation function with voices, and user command for setting sleep mode reservation function with motions The processor 140 controls the overall operations of the display apparatus 100. For this purpose, the processor 140 may include a central processing unit (CPU), a read only memory (ROM), a random access memory (RAM), and so on, for the operations of the display apparatus 100.

Specifically, the user commands inputted through the inputter 120 may be conveyed to the processor 140 and the processor 140 may control so that the function corresponding to the user commands is executed.

For example, the processor 140 may determine the user commands inputted through the remote controller (not illustrated), based on the control signal received through the remote controller signal receiver (not illustrated), and perform the function corresponding to the determined user command. Further, the processor 140 may determine user commands corresponding to the direction and shape of the motion (e.g., opening hand, closing hand, and so on) performed by the user, based on the images photographed through the camera (not illustrated), and perform a function corresponding to the determined user command. Further, the processor 140 may perform voice recognition for the voice received through the microphone (not illustrated) to determine user command corresponding to the user's voice, and perform a function corresponding to the determined user command.

The processor 140 may then determine the user experience index corresponding to the inputted user command, based on the user experience index previously stored at the storage 130.

Specifically, when the user command is inputted through the inputter 120, among the user experience indices previously stored for each of the user commands, the processor 140 may determine the user experience index matched with the inputted user command, to thus determine the user experience index corresponding to the inputted user command.

For example, it is assumed herein that the user command for setting the sleep mode reservation function is inputted using the menu button provided on the remote controller (not illustrated).

In the above example, among the user experience indices previously stored for each of the user commands, based on the previously-stored user experience index matched with the user command for setting the sleep mode reservation function through the menu button, the processor 140 may determine the user experience index for the user command that is inputted through the menu button to set the sleep mode reservation function.

Herein below, a method for determining user experience indices for the user commands inputted with various methods will be described in detail with reference to the attached drawings.

First of all, the inputter 120 may receive a user command for executing the same function of the display apparatus 100 through different types of input methods.

For example, the inputter 120 may receive the user command for setting sleep mode reservation function when receiving a control signal of sequentially selecting buttons A, B, and C provided on the remote controller 200 as illustrated in FIG. 3A, when receiving a voice speaking, "Sleep mode reservation" as illustrated in FIG. 3B, or when receiving a motion of waving hand to the left and right as illustrated in FIG. 3C.

In the above example, the processor 140 may determine user experience index corresponding to the type of input method with which the user command is inputted, among the user experience indices previously stored for each type of the input method for the user command for executing the same function.

To this purpose, the storage 130 may previously store therein user experience indices for each type of the input methods for the user command for executing the same function.

For example, as illustrated in FIG. 4, when it is possible to set the sleep mode reservation function with the remote controller, voices, and motions, the storage 130 may previously store therein the user experience indices as 10, 20, and 30, according to the type of input methods, using the information on the previously-stored user experience indices.

Accordingly, the processor 140 may determine the user experience index for the user command according to the type of input method, using the previously-stored information on the user experience index.

For example, when the sleep mode reservation function is set through the remote controller as illustrated in FIG. 3A, the processor 140 may determine the user experience index to be 10 for the corresponding user command, and when the sleep mode reservation function is set with voices as illustrated in FIG. 3B, the processor 140 may determine the user experience index to be 20 for the corresponding user command, and when the sleep mode reservation function is set with the motion as illustrated in FIG. 3C, the processor 140 may determine the user experience index to be 30 for the corresponding user command.

Meanwhile, the inputter 120 may be inputted with a plurality of user commands for executing the same function.

For example, the user command to set the sleep mode reservation function may be inputted, when the inputter 120 is inputted with a control signal of sequentially selecting buttons A, B, and C provided on the remote controller (not illustrated), inputted with a control signal of selecting button D provided on the remote controller (not illustrated) for a preset time or longer, or inputted with a control signal of selecting a touchpad provided on the remote controller (not illustrated) and then moving a pointer.

In this example, the processor 140 may determine user experience index corresponding to the inputted user command, based on the previously-stored user experience indices matched with each of a plurality of user commands for executing the same function.

To this purpose, the storage 130 may previously store the user experience indices for each of a plurality of user commands for executing the same function.

For example, as illustrated in FIG. 5, the storage 130 may previously store the user experience indices 5, 10, and 5 respectively for: using buttons A, B, C; using button D; and selecting touchpad and then moving pointer.

Accordingly, the processor 140 may determine the user experience indices for each of the user commands, by using the information on the previously-stored user experience indices.

For example, the processor 140 may determine the user experience index to be 5 for the corresponding user command when the sleep mode reservation function is set by sequentially selecting buttons A, B, and C, determine the user experience index to be 10 for the corresponding user command when the sleep mode reservation function is set by selecting button D for a preset time or longer, and determine the user experience index to be 5 for the corresponding user command when the sleep mode reservation function is set by selecting the touchpad and then moving the pointer.

As described, the processor 140 may determine the user experience indices for a variety of user commands.

Further, the processor 140 may store the user experience indices for the user commands in the storage 130.

In the above example, the processor 140 may accumulatively store the user experience indices.

For example, when the user command for setting sleep mode reservation function is inputted by sequentially selecting buttons A, B, and C, the processor 140 may determine the user experience index to be 5 for the corresponding user command and store the same.

When the user command for setting the sleep mode reservation function is then inputted by selecting with a voice speaking, "Set sleep reservation for 7 o'clock," the processor 140 may determine the user experience index to be 30 for the corresponding user command and store the same.

In the above example, the processor 140 may accumulatively store the user experience index to the previously-stored user experience indices. That is, the processor 140 may add the newly-obtained user experience index '30' to the previously-stored user experience index '5' to thus store the user experience index '35.'

Note that this is merely example and, accordingly, the processor 140 may individually store the user experience indices rather than accumulating the user experience indices for the user commands, or accumulatively store only the user experience indices for the same type of user command, or accumulatively store only the user experience indices for the user commands for executing the same function.

Meanwhile, the processor 140 may control the display 110 to display the determined user experience index.

Specifically, when a preset event occurs, the processor 140 may display the user experience index for the inputted user command, or display the sum of user experience indices for the user commands inputted so far.

Figure 6A:
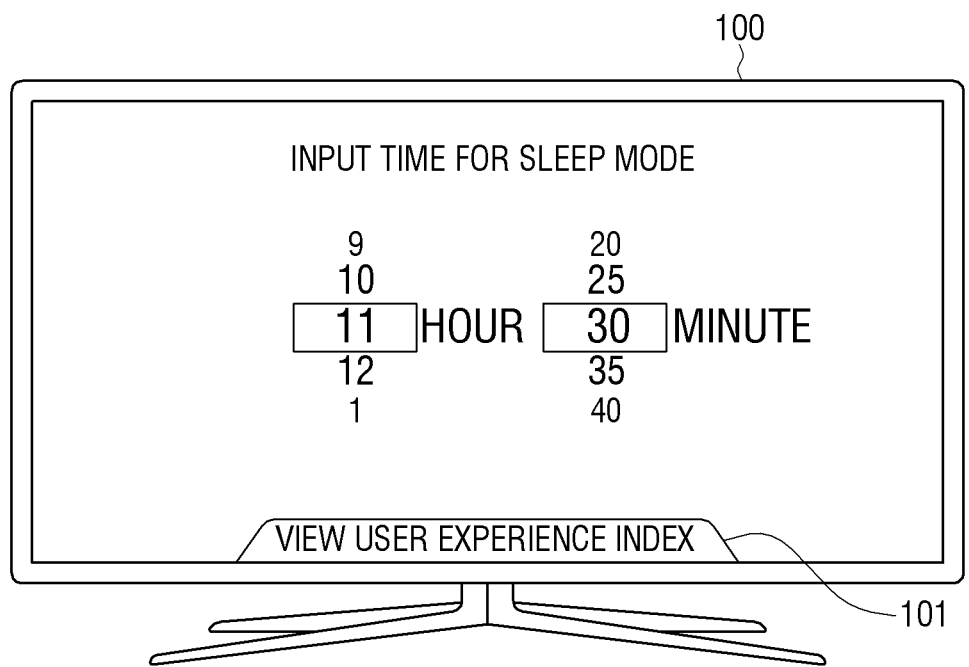
FIGS. 6A and 6B are views provided to explain a method for providing user experience index according to an exemplary embodiment of the present disclosure.

For example, as illustrated in FIG. 6A, when the user command for setting sleep mode reservation function is inputted, the processor 140 may display a screen to set the sleep mode reservation function. In this case, the processor 140 may display GUI 101 to provide the user experience indices.

Figure 6B:
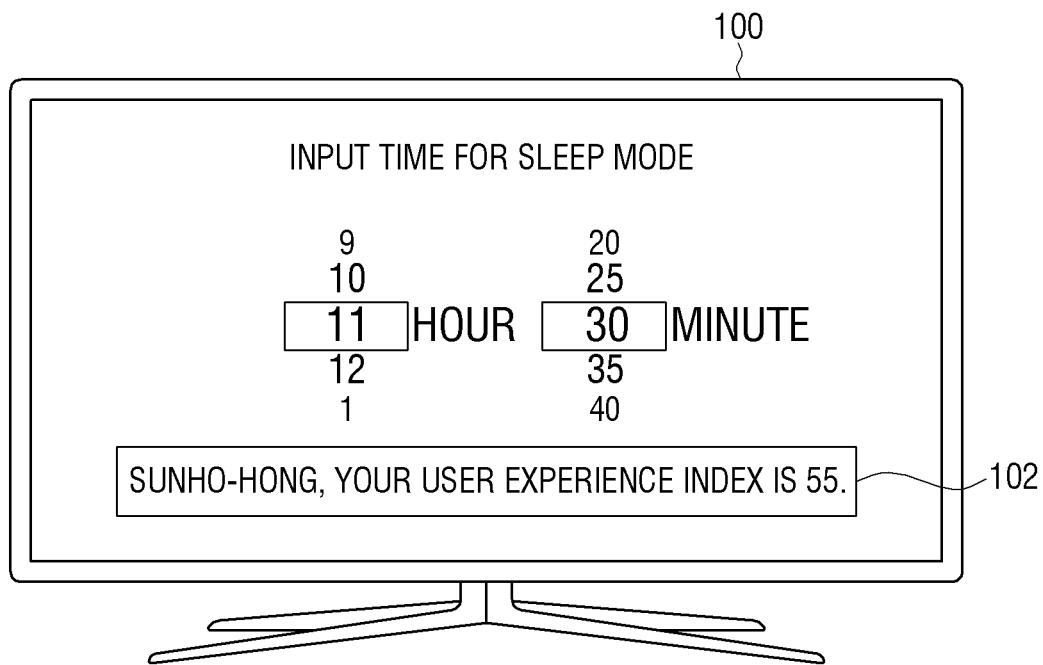

Accordingly, when GUI 101 is selected, the processor 140 may display GUI 102 representing the user experience indices so far, as illustrated in FIG. 6B.

Note that, although the exemplary embodiments have been described above with reference to an assumption that the user experience index is provided through GUI for providing user experience indices, this is merely illustrative example. Accordingly, when the user command is inputted, without requiring a separate GUI, the processor 140 may automatically display the user experience index for the user command, or display the user experience index in response to a variety of events, such as, when a preset time period elapses, when a preset number of user commands are inputted, and so on.

Meanwhile, the processor 140 may control the display 110 to display GUI to guide the user commands for executing the function of the display apparatus 100.

Specifically, the processor 140 may control the display 110 to display GUI for guiding user commands other than the inputted user command that can execute the same function as the inputted user command.

For example, it is assumed herein that a user command for setting sleep mode reservation function is inputted by selecting buttons A, B, and C sequentially.

In the above example, the processor 140 may display GUI indicating the availability of methods other than the method of sequentially selecting buttons A, B, and C for setting the sleep mode reservation function, such as, a method of selecting button D for a preset duration of time, or a method of selecting touchpad and then controlling pointer.

Meanwhile, in the example described above, it is described that the GUI for guiding the user commands other than the inputted user command is displayed in response to the input of the user command. However, this is merely illustrative example, and accordingly, the processor 140 may display GUI for guiding the user command not only at a time point when the user command is inputted, but also in response to occurrence of a variety of events, such as, at preset time intervals, at time point when preset time elapses from the input of the user command, or at time point when the user experience index is displayed.

Further, the processor 140 may display GUI for guiding the user command based on a plurality of user commands inputted for a preset duration of time.

Specifically, when the user experience index corresponding to a plurality of user commands inputted for a preset duration of time is less than a preset threshold value, the processor 140 may display GUI for guiding another user command that can execute the same function as at least one of the plurality of user commands. In this example, the threshold value may be set by the manufacturer, or set and changed by the user.

For example, it is assumed herein that, for a preset duration of time, the user command for setting sleep mode reservation function is inputted by sequentially selecting buttons A, B, and C, and the user command for performing video recording is inputted by the voice speaking, "Video recording".

In the above example, when the sum of the user experience indices for the corresponding user commands is less than the preset threshold value, the processor 140 may display GUI for guiding at least one of other user commands for setting sleep mode reservation function, and at least one user commands for video recording.

For example, the processor 140 may display GUI that indicates the availability of other methods for setting the sleep mode reservation function, such as a method of selecting button D for a preset duration of time, a method of selecting touchpad and then moving pointer, and so on. Further, the processor 140 may also display GUI indicating availability of a method of selecting menu button as another user command that can perform video recording.

Further, when the user experience indices for a plurality of user commands for executing the same function inputted for a preset duration of time is less than a preset threshold value, the processor 140 may display GUI to guide another user commands for executing the same function as the plurality of user commands. In this example, the threshold value may be set at the factory, or set and changed by the user.

For example, it is assumed herein that a user command for setting sleep mode reservation function by sequentially selecting buttons A, B, and C for a preset duration of time, and a user command for setting sleep mode reservation function by selecting touchpad and then controlling pointer, are inputted.

In this example, when both the user command of sequentially selecting buttons A, B, and C, and the user command of controlling the touchpad and then controlling pointer are less than the preset threshold value, the processor 140 may display GUI for guiding another user command for setting sleep mode reservation function.

For example, the processor 140 may display GUI that indicates availability of another method of user command for setting sleep mode reservation function, i.e., availability of a method of selecting button D for a preset duration of time.

Figure 7A:
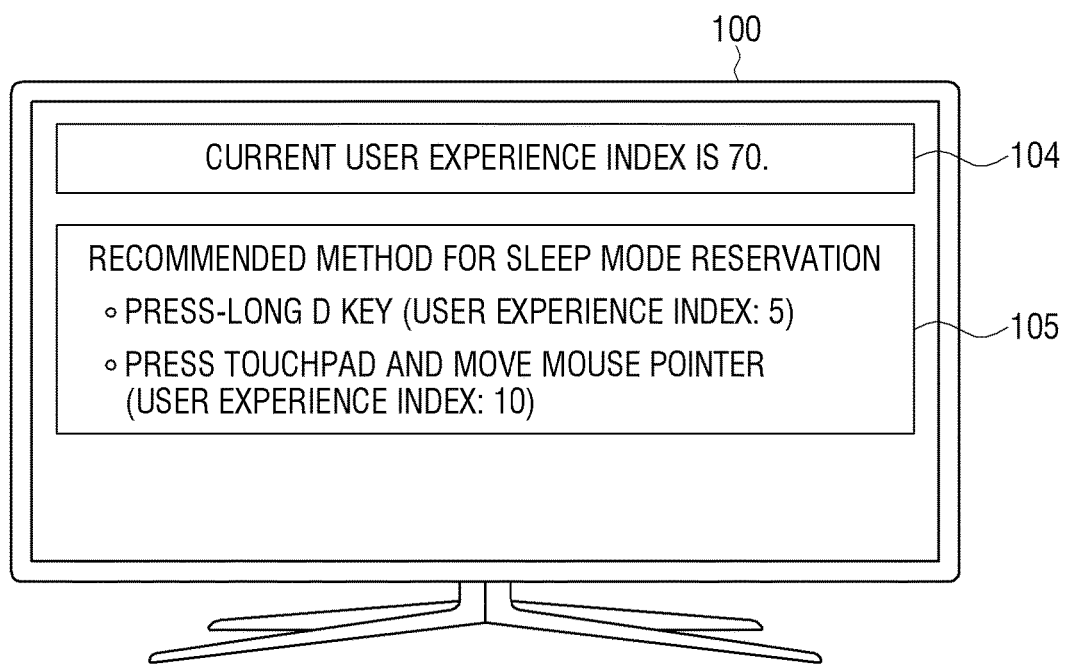
FIGS. 7A and 7B are views provided to explain a method of issuing user command according to an exemplary embodiment of the present disclosure.
Figure 7B:
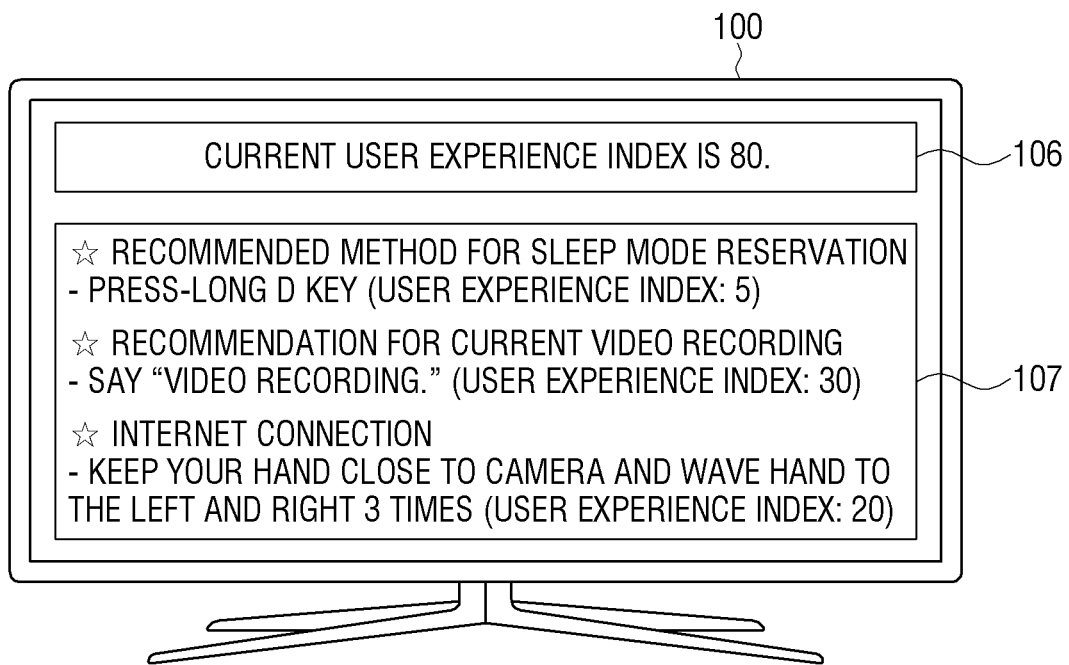

FIGS. 7A and 7B are views provided to explain a method for providing guidance for the user command according to an exemplary embodiment of the present disclosure.

For example, as illustrated in FIG. 7A, the processor 140 may display GUI 104 indicating the current user experience index, along with GUI 105 for providing a recommended method for the sleep mode reservation.

Further, as illustrated in FIG. 7B, in addition to GUI 106 providing current user experience index, the processor 140 may display GUI 107 for guiding the user command for setting sleep mode reservation function, the user command for video recording, and the user command for internet connection.

Meanwhile, the processor 140 may store user experience indices for each of users who input user commands, and display the sums of user experience indices added up for each of the users in the higher order. This will be described as an example by referring to FIG. 8.

To this purpose, the processor 140 may be inputted with identification information (e.g., ID and password) for the user of the display apparatus 100 and store the user experience indices for each of the users who use the display apparatus 100. Then when the user command to display the user experience index is inputted, the processor 140 may display the user experience indices in the higher order. Alternatively, the processor 140 may display the user experience indices in the higher order, by using the user experience indices provided from the server (not illustrated) or another display apparatus (not illustrated).

Figure 8:
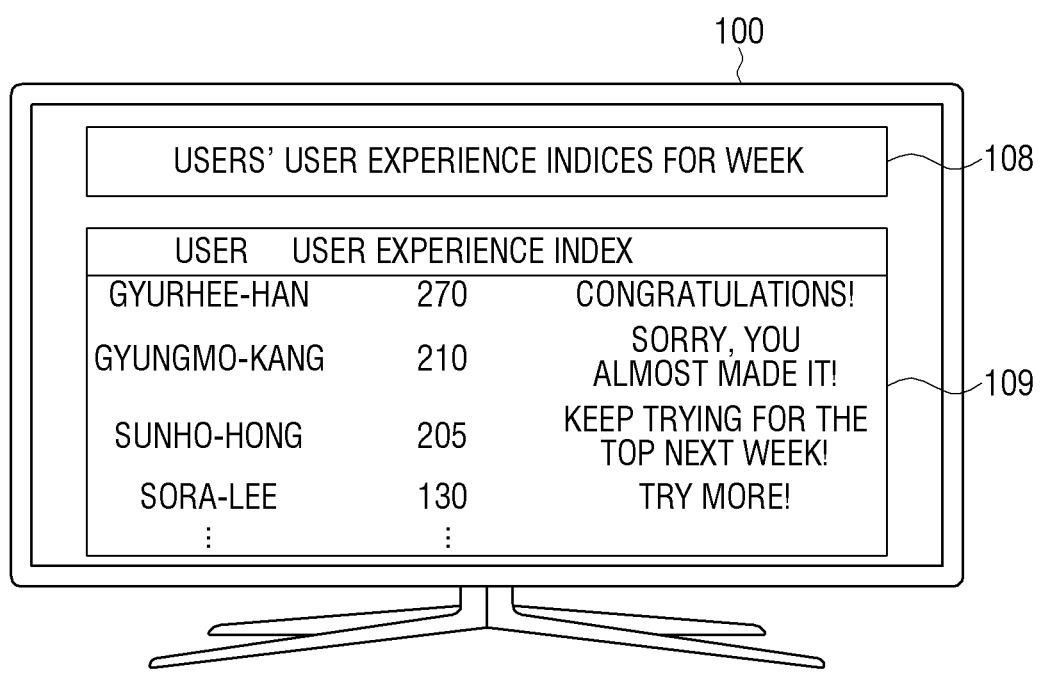
FIG. 8 is a view provided to explain a method for providing a user experience index by users according to an exemplary embodiment of the present disclosure.

FIG. 8 is a view provided to explain a method for providing the user experience indices for each of the user, according to an exemplary embodiment of the present disclosure.

Referring to FIG. 8, the processor 140 may display GUI 108, 109 including user experience indices for each of the users of the week. In this example, GUI 109 may list the user experience indices for a name of each of the users.

Meanwhile, the processor 140 may update the previously-stored user experience index with the user experience indices received from the server (not illustrated), and upon inputting of the user command, may determine the user experience indices corresponding to the inputted user command, by using the updated user experience indices.

That is, the processor 140 may request the server (not illustrated) for the information on the user experience indices, and accordingly, upon receiving the user experience indices from the server (not illustrated), may update the user experience indices with the received indices.

Figure 9:
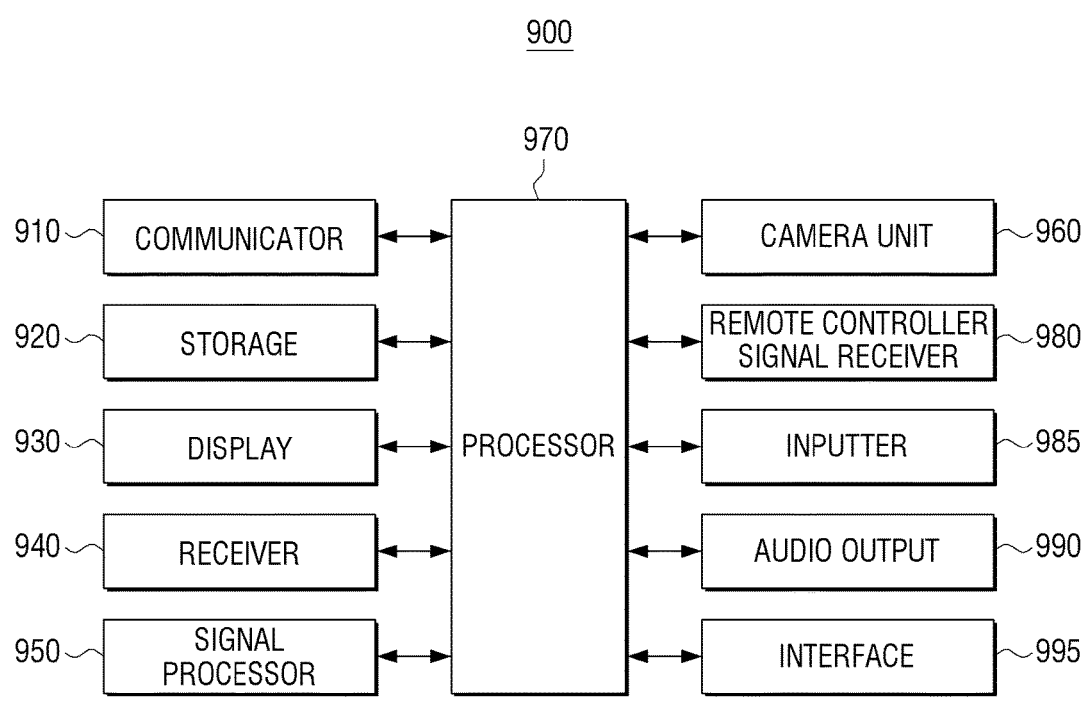
FIG. 9 is a block diagram provided to explain a detailed configuration of a display apparatus according to an exemplary embodiment of the present disclosure.

FIG. 9 is a block diagram illustrating detailed configuration of a display apparatus according to an exemplary embodiment of the present disclosure.

It is assumed herein that the display apparatus 900 is implemented as a TV.

According to FIG. 9, the display apparatus 900 includes a communicator 910, a storage 920, a display 930, a receiver 940, a signal processor 950, a camera unit 960, a processor 970, a remote control signal receiver 980, an input device or inputter 985, an audio output 990, and an interface 995. However, these are merely illustrative examples, and according to exemplary embodiments, some of the components illustrated in FIG. 9 may be omitted or modified, or another component may be added.

The communicator 910 performs communication via network (communications network). Specifically, the communicator 910 may perform communication with a variety of external devices (e.g., other apparatuses, or servers) connected to the network, by using network address allocated to the display apparatus 900 for the purpose of network communication.

The network address may be Internet protocol (IP) address. That is, the communicator 910 may perform communication with the other external devices (not illustrated) connected to the internet network, by using the IP address.

Meanwhile, the communicator 910 may perform network communication with various communication methods.

Specifically, the communicator 910 may perform network communication with various communication methods including, wired/wireless Local Area Network (LAN), WiFi, WAN, Ethernet, Bluetooth, Zigbee, Universal Serial Bus (USB), IEEE 1394, and so on. To this purpose, the communicator 910 may be provided with various communication modules to perform network communications according to the respective communication methods. For example, for the wired LAN method, the communicator 910 may be provided with wired LAN card (not illustrated) to perform communication with wired LAN method, or provided with WiFi communication chip (not illustrated) to perform communication with WiFi method.

The storage 920 stores various data and operating system (OS) to drive and control the display apparatus 900.

For this purpose, the storage 920 may be implemented as a storage medium such as non-volatile memory (e.g., flash memory), electrically erasable ROM (EEROM), hard disk, and so on.

The display 930 displays various screens. For this purpose, the display 930 may be implemented as liquid crystal display (LCD), organic light emitting display (OLED), plasma display panel (PDP), and so on.

The receiver 940 may receive broadcast content (or broadcast signal). The broadcast content may include image, audio, additional data (e.g., EPG), and the receiver 940 may receive broadcast content from a variety of sources such as terrestrial wave broadcasting, cable broadcasting, satellite broadcasting, internet broadcasting, and so on. In one example, the receiver 940 may receive video streams coded with broadcast content images.

The receiver 940 may be implemented as a form that includes configuration such as tuner (not illustrated), demodulator (not illustrator), equalizer (not illustrated), and so on, in order to receive the broadcast content transmitted from the broadcasting station.

The signal processor 950 performs signal processing for the content received at the receiver 940. Specifically, the signal processor 950 may perform a signal processing operation such as decoding, scaling, frame rate conversion, and so on for the images constructing the content so that the content is processed into a form that can be outputted through the display 930. Further, the signal processor 950 may perform signal processing such as decoding, and so on for the audio constructing the content so that the content is processed into a form that can be outputted at the audio output 990.

The camera unit 960 may photograph the user. In this example, the processor 970 may determine user command that corresponds to the user's motion, by using the photographed image.

The processor 970 controls the overall operation of the display apparatus 900. The processor 940 may include central processing unit (not illustrated), Read Only Memory (ROM) (Not illustrated), and Random Access Memory (not illustrated) for the operation of the display apparatus 900.

ROM stores a set of instructions for system booting. When turn-on command is inputted and power is supplied, CPU copies the O/S stored at the storage 920 onto RAM according to the instruction stored at ROM, and executes O/S to thus boot the system. Upon completing booting, the main CPU copies various application programs stored at the storage 920 onto RAM and executes the application programs copied onto RAM to thus perform various operations.

CPU accesses the storage 920 and performs booting with the O/S stored at the storage 920. CPU then performs various operations using various programs, contents, data and so on stored at the storage 920.

The remote control signal receiver 980 receives control signals inputted from the remote controller (not illustrated).

The inputter 985 is inputted with various user commands.

The audio output 990 may convert the audio signal outputted from the signal processor 950 into sound and output this through a speaker (not illustrated), or output to an external device connected via an external output terminal (not illustrated).

The interface 995 connects various other devices (not illustrated) with the display apparatus 900. Further, the interface 995 may transmit the content, and so on, which are previously stored at the display apparatus 900, to other devices (not illustrated), or receive the contents from the other devices (not illustrated).

To this purpose, the interface 995 may include at least one of High-Definition Multimedia Interface (HDMI) input terminal, component input terminal, PC input terminal, or USB input terminal.

Figure 10:
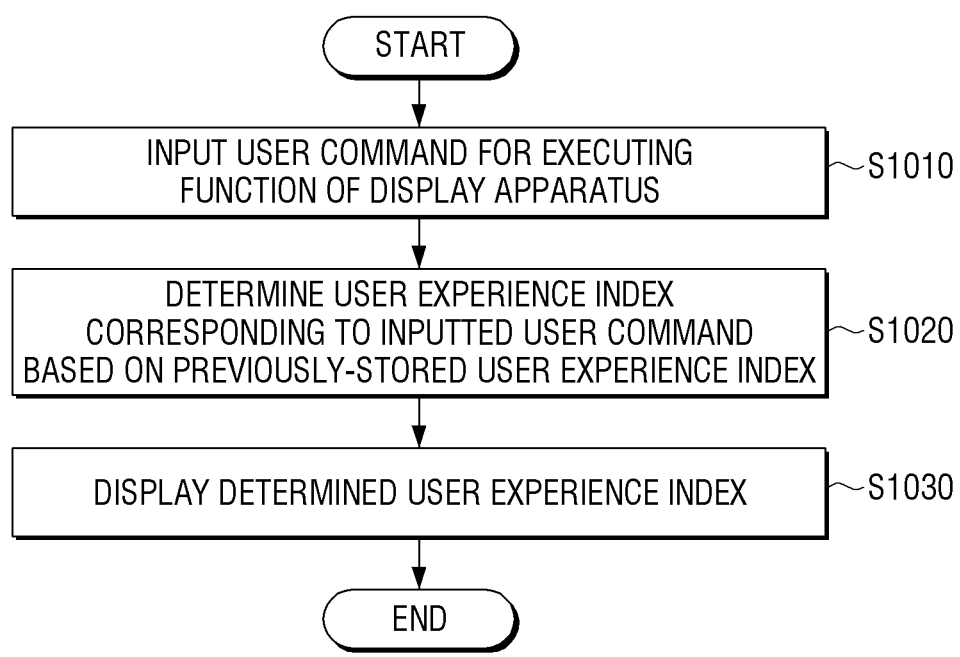
FIG. 10 is a flowchart to describe a controlling method of a display apparatus according to an exemplary embodiment of the present disclosure.

FIG. 10 is a flowchart provided to explain a control method of a display apparatus according to an exemplary embodiment of the present disclosure.

First, at S1010, a user command to execute the function of display apparatus is inputted.

Then, at S1020, the user experience index corresponding to the inputted user command is determined based on the previously-stored user experience index matched with each of the user commands, and the determined user experience indices are displayed, at S1030.

Specifically, a plurality of user commands to execute the same function of the display apparatus may be inputted, and based on the previously-stored user experience indices matched with each of the plurality of user commands to execute the same function, the user experience index corresponding to the inputted user command may be determined.

Further, the user command to execute the same function of the display apparatus may be inputted with different types of input methods, and based on the previously-stored user experience indices for each type of the input methods for the user commands, the user experience index corresponding to the type of the input method with which the user command is inputted, may be determined.

Meanwhile, the user experience index corresponding to the user command may be stored.

In addition, GUI for guiding user command other than the inputted user command, which can execute the same function as the inputted user command, may be displayed.

Specifically, when the user experience index corresponding to a plurality of user commands inputted for a predetermined duration of time is less than a preset threshold value, GUI for guiding another user command that can execute the same function as at least one of the plurality of user commands, may be displayed.

Further, when the user experience indices for a plurality of user commands for executing the same function inputted for a preset duration of time are less than a preset threshold value, GUI for guiding another user command that can execute the same function as the plurality of user commands, may be displayed.

Meanwhile, the user experience index for each of users inputting user commands may be stored, and sums of user experience indices obtained for each of the users may be displayed in a decreasing order.

Further, the previously-stored user experience indices may be updated with the user experience indices received from the server, and upon input of the user command, the user experience index corresponding to the inputted user command may be determined by using the updated user experience index.

Meanwhile, the method of determining the user experience index for the user command and providing the same have already been described above with reference to FIGS. 1 to 9.

Meanwhile, a control method of the display apparatus 100 according to various exemplary embodiments may be implemented as program codes executable on a computer and provided to respective servers or devices to be executed by the processor 140 while being stored in a non-transitory computer readable medium.

In one example, a non-transitory computer readable medium may be provided, storing therein a program to perform operations of inputting user command for executing the function of display apparatus 100, storing the user experience indices representing utilization of the display apparatus 100 by the user matched with each of user commands, determining user experience index corresponding to the inputted user command based on the previously-stored user experience indices, and displaying the determined user experience index.

The foregoing exemplary embodiments and advantages are merely exemplary and are not to be construed as limiting the exemplary embodiments. The present teaching can be readily applied to other types of apparatuses. Also, the description of the exemplary embodiments of the present inventive concept is intended to be illustrative, and not to limit the scope of the claims.

Although a few embodiments have been shown and described, it would be appreciated by those skilled in the art that changes may be made in these embodiments without departing from the principles and spirit thereof, the scope of which is defined in the claims and their equivalents.

What is claimed is:

1. A display apparatus, comprising:
a display;
an input device including a circuitry;
a memory storing a user experience index matched with each of user commands, wherein the user experience index represents a user's utilization of the display apparatus according to a type of a user command; and
a processor configured to:
based on a user command for executing a function of the display apparatus being input through the input device, determine the user experience index corresponding to a type of the input user command based on the stored user experience indices, and
based on the determined user experience index being less than a preset threshold value, control the display to display information on the determined user experience index and information on another user command using which a same function as the input user command is executable.

2. The display apparatus of claim 1, wherein the input device is configured to input a plurality of the user commands to execute a same function of the display apparatus, and
the processor is configured to determine the user experience index corresponding to the input plurality of user commands based on the stored user experience matched with each of the input plurality of user commands to execute the same function.

3. The display apparatus of claim 1, wherein the input device is configured to input a plurality of user commands to execute a same function of the display apparatus with different types of input methods, and
the processor is configured to determine the user experience index corresponding to a type of input method with which the input plurality of user commands are input, based on the stored user experience index for each type of the input methods for the input plurality of user commands to execute the same function.

4. The display apparatus of claim 1, wherein the processor is configured to store the user experience index corresponding to the input user command in the memory.

5. The display apparatus of claim 1, wherein, based on user experience indices for the plurality of the user commands to execute the same function input for a preset duration of time being less than a preset threshold value, the processor is configured to control the display to display information to guide to the other user command using which the same function as the input plurality of user commands is executable.

6. The display apparatus of claim 1, wherein the processor is configured to store the user experience index for each user who inputs the user command, and control the display to display sums of user experience indices obtained for each of the users in a decreasing sum order.

7. The display apparatus of claim 1, wherein the processor is configured to update the stored user experience index with another user experience index received from a server, and determine the user experience index corresponding to the input user command using an updated user experience index.

8. A control method of a display apparatus, comprising:
inputting a user command to execute a function of the display apparatus;
determining a user experience index corresponding to a type of the input user command, based on stored user experience indices matched with each of user commands, wherein the user experience index represents a user's utilization of the display apparatus according to a type of a user command; and
based on the determined user experience index being less than a preset threshold value, displaying information on the determined user experience index and information on another user command using which a same function as the input user command is executable.

9. The control method of claim 8, wherein
the inputting comprises inputting a plurality of user commands to execute a same function of the display apparatus, and
the determining comprises determining the user experience index corresponding to the input plurality of user commands based on the stored user experience indices matched with each of the input plurality of user commands to execute the same function.

10. The control method of claim 8, wherein
the inputting comprises inputting a plurality of user commands to execute the same function of the display apparatus with different types of input methods, and
the determining comprises determining the user experience index corresponding to a type of input method with which the input plurality of user commands, based on the stored user experience index for each type of the input method for the input plurality of user commands to execute the same function.

11. The control method of claim 8, further comprising storing the user experience index corresponding to the input user command.

12. The control method of claim 8, wherein, based on user experience indices for a plurality of the user commands to execute the same function input for a preset duration of time being less than a preset threshold value, the displaying comprises displaying information to guide to the other user command using which the same function as the input plurality of the user commands is executable.

13. The control method of claim 8, further comprising:
storing the user experience index for each of user who inputs the user command, and displaying sums of user experience indices obtained for each of the users in a decreasing sum order.

14. The control method of claim 8, wherein the determining comprises the stored user experience index with another user experience index received from a server, and determining the user experience index corresponding to the input user command using an updated user experience index.

15. A non-transitory computer readable storage medium storing methods according to claim 8.

* * * * *